T. BOVEY.
VEHICLE HEATER.
APPLICATION FILED JUNE 18, 1917. RENEWED SEPT. 18, 1919.
1,341,879.
Patented June 1, 1920.
2 SHEETS—SHEET 1.
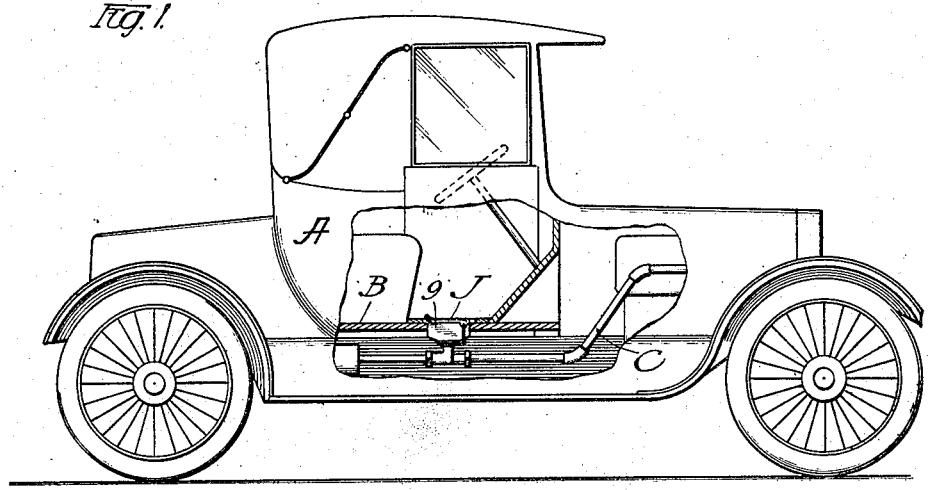
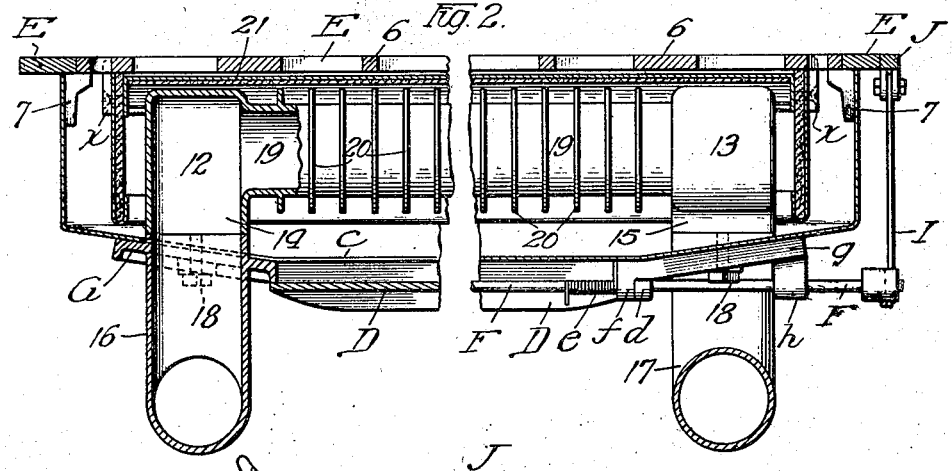
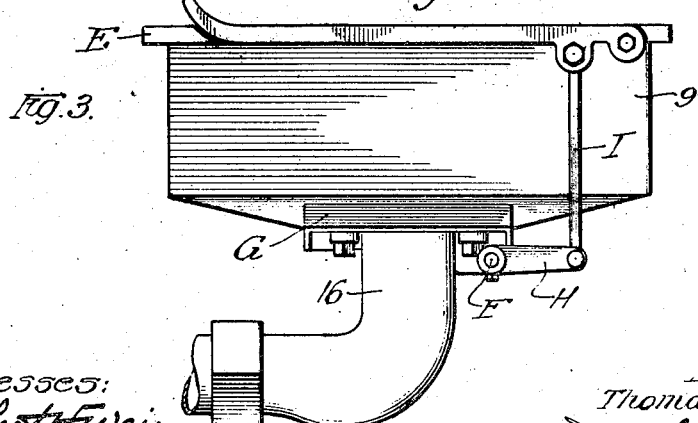
Witnesses:
Robert H. Weir
Florence Mitchell
Inventor
Thomas Bovey
By Franch Thomason
Atty.

T. BOVEY.
VEHICLE HEATER.
APPLICATION FILED JUNE 18, 1917. RENEWED SEPT. 18, 1919.
1,341,879.
Patented June 1, 1920.
2 SHEETS—SHEET 2.
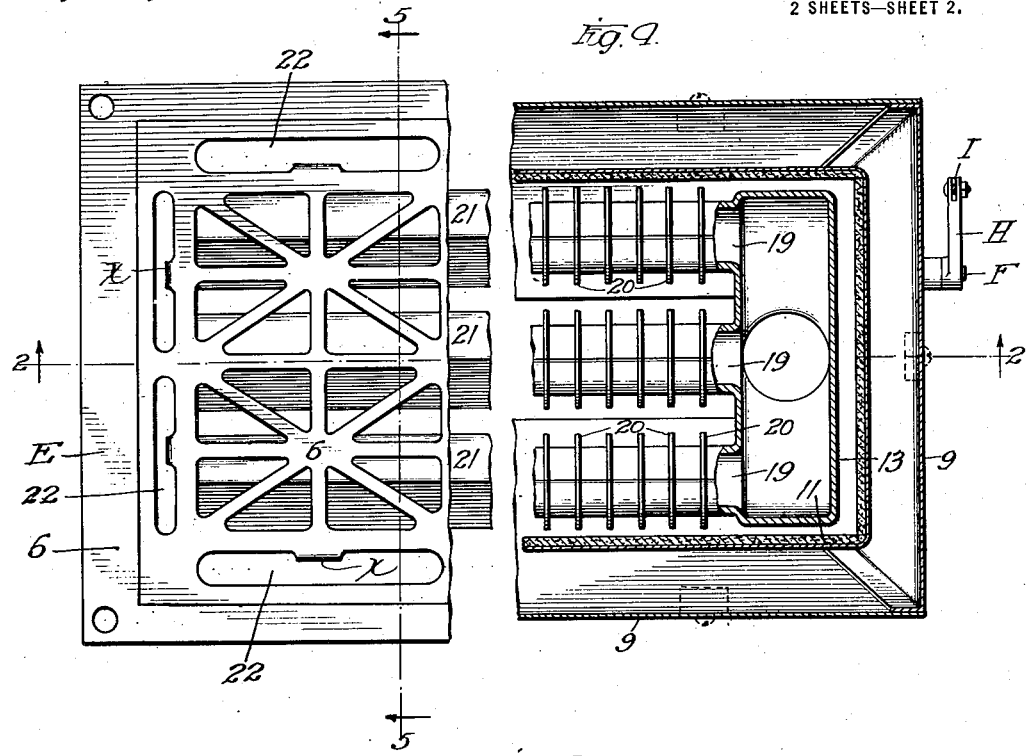
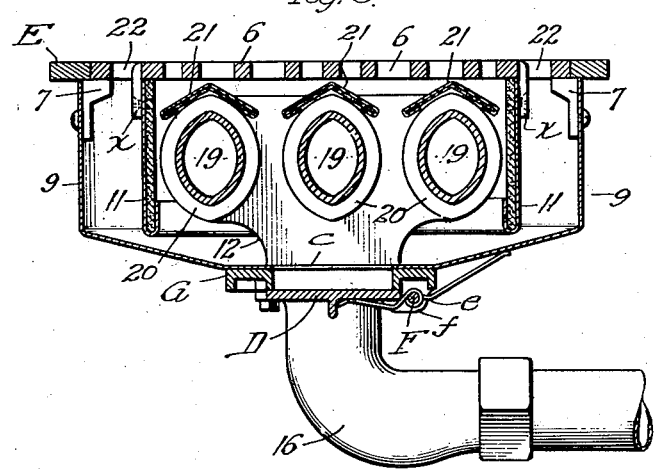

# UNITED STATES PATENT OFFICE.

THOMAS BOVEY, OF CHICAGO, ILLINOIS.

VEHICLE-HEATER.

1,341,879.

Specification of Letters Patent.

Patented June 1, 1920.

Application filed June 18, 1917, Serial No. 175,324. Renewed September 18, 1919. Serial No. 324,575.

*To all whom it may concern:*

Be it known that I, THOMAS BOVEY, a citizen of the United States, residing at Chicago, in the county of Cook and State of Illinois, have invented new and useful Improvements in Vehicle-Heaters, of which the following is a full, clear, and exact description.

My invention relates to heating apparatus for limousines or inclosed bodies of motor driven vehicles.

The object of my invention is to utilize the exhaust gases of the engine of the vehicle or the hot water from the water jacket thereof to heat the interior of the vehicle body, and to provide a simply constructed register or radiator for the purpose that will not overheat nor burn the structure of the car in the locality where it is placed, and which can be manipulated to admit and heat cold air from the outside or to draw the colder air from the lower part of the limousine or body and heat and expel the heater air back into the same. This I accomplish by the simple and inexpensive means, substantially as hereinafter fully described, and as pointed out in the claims.

In the drawings:

Figure 1 is a side view of an automobile having a portion of the inclosed body thereof broken away to show the application of my improvements thereto.

Fig. 2 is a longitudinal vertical section of my improved heater, drawn to a larger scale, taken on dotted line 2—2, Fig. 4.

Fig. 3 is an end view thereof.

Fig. 4 is a view showing a plan of one-half of the same, and the other half in horizontal section.

Fig. 5 is a transverse vertical section taken on dotted line 5—5, Fig. 4.

Referring to the drawings, A represents the inclosed body of an automobile, B the floor thereof, and C the exhaust pipe of the engine of the same which generally extends rearwardly under said floor and discharges at the rear end of the car.

My improved heater comprises an open rectangular frame E, the outer edges of which are seated in the rabbeted edges of a rectangular opening in floor B in which the heater is set. This frame has lugs 7, 7, projecting inward from the sides and ends of its inner edge upon which a removable open work cover or top-plate 6 is supported so that its upper surface is flush with the upper surface of frame E. These lugs also extend downward from the underside of frame E and have the sides of a sheet metal casing 9 secured thereto so that the upper edges thereof fit tight against the under side of the frame. This casing is, preferably, rectangular, and depends from the marginal plate a suitable distance below the plane of floor B, in such position that exhaust-pipe C connects therewith, as will hereinafter be more fully explained.

The side and end walls of casing 9 are vertical, and its bottom is inclined downward from said sides and ends to a longitudinally elongated central opening or trap *c* through which the dirt and dust that may percolate down through the top-plate into the heater can discharge. Opening *c* is closed by a flat door D, which is, preferably, made of cast metal, and has lugs *d* projecting from one of its longer sides that are securely mounted on a longitudinally disposed rock-shaft F. Shaft F is journaled in lugs *f*, *f*, that projects from and are made integral with one of the longer sides of a metal marginal-frame G, which latter is secured to the underside of the said bottom and reinforces the edges of said opening *c*. Door D is kept closed by a coil-spring *e* surrounding shaft F, one end of which bears against the underside of the door and the other end against the underside of the bottom of the casing.

The ends of marginal-frame G extend beyond the ends *g*, *g*, of opening *c* and are inclined upward at the same angle as and against the incline of the ends of the bottom of the casing to which they are secured. One of these inclined ends *g* is provided with a suitable bearing-lug *h* for an extension of one end of shaft F, which terminates under one end of said open rectangular frame E and has an arm H projecting therefrom the outer end of which is connected by a vertically disposed link I to a horizontal transversely disposed lift or lever J. Lever J consists of a flat strip of metal that is provided at one end with knuckles and hinged by means of a suitable pintle to a knuckle made integral with the said end margin of rectangular frame E. The margin of said frame E is cut away to accommodate the presence of this lever, and when door D is closed the body of the latter lies flat with its upper surface flush with that of said frame E, with the exception of its end opposite its fulcrum which is curved upward to afford a purchase for the fingers or the toe of a person's shoe when it is desired to raise the same and open door D.

Cover 6 has lugs $x$, $x$, depending from its underside a short distance from the sidewalls and the end-walls of casing 9 to which a rectangular drop-wall 11 is secured so that its upper edge is in contact with the underside of the cover. The outside of drop-wall 11 is made of sheet metal and it is lined on the inside with asbestos and is separated all around a suitable distance from the sidewalls and the end-walls of the casing by a suitable air-space and drops down to within a short distance of the bottom of the same. If desired, the lower edges of the outer sheet metal surface of the drop-wall can be curled inward and upward to afford a binding for the lower edges of the asbestos lining.

The heat radiating devices of my improved heater comprise two transversely disposed hollow heads 12 and 13, which are located, one at each end of the chamber inclosed by the drop-wall, but out of contact therewith. These headers are supported by hollow bosses 14 and 15, respectively, that are, preferably, cast integral therewith and extend centrally down therefrom and have their lower edges correspondingly inclined so as to rest upon the inclined ends of the bottom of the casing above the inclined ends of marginal-frame G. These hollow bosses are provided with restricted openings in their lower ends which coördinate with openings in the inclined ends of both the bottom and marginal-frame G and with the mouth of tubular elbows 16 and 17, respectively. Asbestos or other suitable insulating packing is interposed between the bottoms of bosses 14 and 15 and the bottom of the casing, and between the flanges of the upper end of the elbows and the extensions of cover 6, and the joint as thus constructed is made tight by means of vertical bolts 18 that pass down through the bottom of said bosses alongside of the central restricted opening therein and through flanges projecting laterally from the upper ends of the elbows.

Headers 12 and 13 are connected by three integral longitudinally extending pipes 19 and these pipes are provided with a series of equi-distant transverse flanges 20 to give them ample heat radiating surface. Both the headers and these pipes 19 are separated a suitable distance from cover 6, and between each of said pipes 19 and the said cover said pipes are roofed over from end to end by longitudinally disposed deflectors 21. These deflectors are, preferably, shaped like hip-roofs, and their ends extend over the headers and are secured in any suitable manner to the vertical ends of the drop-wall.

I prefer to make the top of these deflectors of sheet metal and the underside thereof of asbestos, and I prefer to turn the longitudinal edges of said sheet metal deflectors downward and inward so as to bind the longitudinal edges of the asbestos. The width of these deflectors is such that the longitudinal edges do not come in contact with each other or with the longitudinal sides of the drop-wall, thus leaving longitudinally disposed openings up through which the heat radiated from pipes 19 can pass into the car and down through which any dust or debris falling into the heater can drop into the inclined bottom of the casing without being deposited on the pipes, which latter would, if said debris were inflammable, in the absence of said deflectors, burn the same and cause the car to become filled with a more or less objectionable odor.

The cover is provided with a series of elongated openings 22 between the vertical planes of the vertical walls of the casing and the drop-walls, and is also provided with suitably designed fret-work within the vertical planes of the drop-walls. The design of this fret-work is immaterial and it can be varied according to the artistic ideas of the manufacturer.

The construction of the drop-wall is especially designed to facilitate the result which it is desired to accomplish by means of my improved heater. By having the inner surface of said drop-wall made of asbestos, the outer sheet metal is kept cool and is not subject to the extremes of any expansion or contraction, which it would otherwise experience if directly exposed to the heat radiated by the heating devices inclosed within the same. The upper edge of this wall is practically in contact with the underside of the cover, and, therefore, the cool air next the floor of the limousine surrounding the heater will flow downward through the space between the drop-wall and the casing more naturally, and thus keep up a continuous circulation as the air is heated by the heat radiating devices and expelled upward through the cover from the inclosure surrounded by said wall.

It is very essential that a heater of the type to which my improvements are applied should be constructed so as to prevent irregular expansion and contraction of the metal parts thereof. This is particularly true of the perforated cover. This cover is usually made of cast iron, and if its free expansion were not permitted as, for instance, by making the drop wall unyielding and integral therewith, the cover would buckle, or, if it were not free to do so, it would break. If it did buckle the weight of a passenger stepping on it would be liable to break it. My improved construction removes this possibility of breakage by the adoption of the construction of the drop-wall and the means for suspending it. It will be observed by reference to the drawings that lugs x, x, are employed to secure the upper edge of this wall to the cover at comparatively great intervals apart, and further, as hereinbefore stated, that the said wall is made of sheet metal and lined with asbestos; there is, therefore, a minimum of expansion and contraction, and whatever the extent of this expansion or contraction of the drop-wall may be it will not effect the cover nor will the expansion or contraction of the cover effect the drop-wall.

The deflectors 21, hereinbefore described, have their ends secured in any suitable manner to the ends of the drop-walls, and they are also made of sheet metal and have their undersides faced with asbestos. Any expansion or contraction of these deflectors might effect a slight movement of the ends of the drop-walls, but as the latter cannot transmit such movement to the cover no injury will result therefrom.

What I claim as new is:

1. A heater for vehicles comprising a suitable casing, an open work cover therefor, suitable heat radiating devices supported at the ends thereof by the bottom of said casing, a drop-wall suitably secured to said cover and inclosing said heating devices, but separated therefrom and from the walls and bottom of said casing; the bottom of said casing being inclined downward toward the center thereof and provided with a discharge opening, a spring controlled closure for said opening, and means for opening said closure.

2. A heater of the kind specified comprising a marginal frame, a perforate cover seated within and inclosed by the frame, an outer imperforate casing secured to said marginal frame and depending therefrom, and an opening in its bottom toward which said bottom inclines, a spring controlled door for closing said opening, means for opening said door, a heat radiating device within said casing having its ends extending down through said bottom and supported thereby, and a drop-wall depending from said cover between the heat radiating devices and casing but separated therefrom.

3. A heater of the kind specified comprising a marginal frame, a perforate cover seated within and inclosed by the frame, an outer imperforate casing secured to said marginal frame and depending therefrom, and an opening in its bottom toward which said bottom inclines, a spring controlled door for closing said opening, means for opening said door, a heat radiating device within said casing having its ends extending down through said bottom and supported thereby, and an asbestos lined drop-wall depending from said cover between the heat radiating devices and casing but separated therefrom.

4. A heater of the kind specified comprising a marginal frame, a perforate cover seated within and inclosed by the frame, an outer imperforate casing secured to said marginal frame and depending therefrom, and an opening in its bottom toward which said bottom inclines, a spring controlled door for closing said opening, means for opening said door, a heat radiating device within said casing having its ends extending down through said bottom and supported thereby, and a drop-wall having an inner surface of asbestos and an outer surface of metal depending from said cover between the heat radiating devices and casing but separated therefrom.

5. A heater of the kind specified having a perforate top, a casing secured to and depending from the margins thereof and having an opening in its bottom which latter is inclined toward the said opening, a door for closing said opening, a pivotal bolt one end of which is extended beyond its bearings, an arm on said extended end, a horizontally disposed lever fulcrumed at one end to the margin of said top flush with the upper surface of the latter, the unsecured end of which is bent upward, a link connecting said arm and lever, heat radiating devices the ends of which extend down through and are supported by said bottom above said opening, and a drop-wall depending from said top down between said heat radiating device and said casing but out of contact with the same.

6. A heater of the kind specified having a perforate top, a casing secured to and depending from the margins thereof, a heat radiating device including a plurality of horizontal pipes, a drop-wall which is expansible independently of the top and whose upper edge is in contact with and which depends from said top between said device and the casing but out of contact therewith, and deflectors below said perforated top that extend above and parallel to said pipes and whose ends are secured to said drop-wall.

7. A heater of the kind specified having a perforate top, a casing secured to and depending from the margins thereof, a heat radiating device including a plurality of longitudinally disposed pipes, a drop-wall depending from said top between said device and casing but out of contact therewith, and longitudinally disposed hip-roof shaped deflectors inclosed within said drop-wall below said top that extends above and parallel to said pipes.

8. A heater of the kind specified having a perforate top, a casing secured to and depending from the margins thereof, a heat radiating device including a plurality of horizontal pipes, a drop-wall whose upper edge is in contact with and which depends from said top between said device and the casing but out of contact therewith, and deflectors inclosed within said drop-wall below said perforated top that extend above and parallel to said pipes the underside of each of which is faced with asbestos.

9. A heater of the kind specified comprising a perforate top, a casing secured to and depending from the margins thereof, a heat radiating device including a plurality of longitudinally disposed pipes, headers with which the ends of said pipes are connected and which are supported by said casing a drop-wall which is expansible independent of the top and the upper edge of which is in contact with and which extends from said top between said device and said casing but out of contact therewith, and deflectors inclosed within said drop-wall below said perforated top that extends above and parallel to said pipes.

10. A heater of the kind specified comprising a perforate top, a casing secured to and depending from the margins thereof, a heat radiating device including a plurality of longitudinally disposed pipes, headers with which the ends of said pipes are connected and which are supported by said casing, a drop-wall secured at intervals to said top so that its upper edge is in contact therewith and depending from said top between said device and said casing but out of contact therewith, and deflectors inclosed within said drop-wall below said perforated top that extend above and parallel to said pipes and having the ends thereof secured to said drop-wall.

11. A heater of the kind specified comprising a perforate top, a casing secured to and depending from the margins thereof, a heat radiating device including a plurality of longitudinally disposed pipes, headers with which the ends of said pipes are connected and which are supported by said casing, a drop-wall the inner surface of which is made of asbestos depending from said top between said device and said casing but out of contact therewith, and deflectors below said perforated top the under surface of which is made of asbestos extending above and parallel to said pipes and which are inclosed within and have the ends thereof secured to said drop-wall.

12. A heater of the kind specified comprising a perforate cover, a marginal frame in which said cover is removably placed, a casing secured to and depending from the frame, a heat radiating device including a plurality of longitudinally disposed pipes, headers with which the ends of said pipes are connected and which are supported by said casing, a drop-wall depending from said cover between said device and said casing but out of contact therewith, and deflectors inclosed within said drop-wall below said perforated top that extend above and parallel to said pipes.

13. A heater of the kind specified comprising a perforate cover, a marginal frame in which said cover is removably placed, a casing secured to and depending from said marginal frame, a heat radiating device including a plurality of longitudinally disposed pipes, headers with which the ends of said pipes are connected and which are supported by said casing, a drop wall which is expansible independently of said cover with which its upper edge is connected and depends from said cover between said device and said casing but out of contact therewith, and deflectors below said perforated top extending above and parallel to said pipes and which are inclosed within and have the ends thereof secured to said drop-wall.

14. A heater of the kind specified comprising a perforate cover, a marginal frame in which said cover is removably placed, a casing secured to and depending from said marginal frame, a heat radiating device including a plurality of longitudinally disposed pipes, headers with which the ends of said pipes are connected and which are supported by said casing, a drop-wall the inner surface of which is made of asbestos and which has its upper edge secured at intervals to and which depends from said cover between said device and said casing but out of contact therewith, and deflectors below said perforated top the under surface of which is made of asbestos extending above and parallel to said pipes and which are inclosed within and have the ends thereof secured to said drop-wall.

15. In a heater of the kind specified, a perforate cover, a suitable support therefor, a casing secured to said support, a heat radiating device inclosed within said casing, an inlet pipe for said device extending through said casing, an outlet pipe for said device extending through said casing, and a drop-wall expansible independently of said cover which is secured to and has its upper edge in contact with said cover and depending therefrom between said heating devices and casing.

16. A heater of the kind specified comprising a perforated top, a casing secured to and depending from the margins thereof, a heat radiating device including a plurality of longitudinally disposed pipes, headers with which the ends of said pipes are connected and which are supported by said casing, a drop-wall the inner surface of which is made of asbestos depending from said top between said device and said casing.

17. A heater of the kind specified comprising a perforated top, a casing secured to and depending from the margins thereof, a heat radiating device including a plurality of longitudinally disposed pipes, headers with which the ends of said pipes are connected and which are supported by said casing, a drop-wall the inner surface of which is made of asbestos and which is secured at intervals to said top so that its upper edge is in substantial contact with the same and which depends from said top between said device and said casing.

In witness whereof I have hereunto set my hand this 12th day of June, 1917.

THOMAS BOVEY.

Witnesses:
 FRANK D. THOMASON,
 FLORENCE MITCHELL.